US008422741B2

(12) United States Patent
Eggert et al.

(10) Patent No.: US 8,422,741 B2
(45) Date of Patent: Apr. 16, 2013

(54) ESTIMATING OBJECTS PROPER MOTION USING OPTICAL FLOW, KINEMATICS AND DEPTH INFORMATION

(75) Inventors: Julian Eggert, Obertshausen (DE); Sven Rebhan, Obertshausen (DE); Jens Schmudderich, Rodgau (DE); Volker Willert, Seligenstadt (DE)

(73) Assignee: Honda Research Institute Europe GmbH, Offenbach (DE)

( * ) Notice: Subject to any disclaimer, the term of this patent is extended or adjusted under 35 U.S.C. 154(b) by 743 days.

(21) Appl. No.: 12/599,201

(22) PCT Filed: Aug. 21, 2008

(86) PCT No.: PCT/EP2008/006896
§ 371 (c)(1),
(2), (4) Date: Nov. 6, 2009

(87) PCT Pub. No.: WO2009/024349
PCT Pub. Date: Feb. 26, 2009

(65) Prior Publication Data
US 2011/0243390 A1    Oct. 6, 2011

(30) Foreign Application Priority Data

Aug. 22, 2007  (EP) ..................................... 07114793

(51) Int. Cl.
*G06K 9/00*  (2006.01)
(52) U.S. Cl.
USPC .............................. 382/107; 382/153; 382/154
(58) Field of Classification Search ........................ None
See application file for complete search history.

(56) References Cited

U.S. PATENT DOCUMENTS

| 6,269,175 | B1* | 7/2001 | Hanna et al. | 382/107 |
|---|---|---|---|---|
| 6,490,364 | B2* | 12/2002 | Hanna et al. | 382/107 |
| 7,894,528 | B2* | 2/2011 | Rav-Acha | 375/240.16 |
| 8,036,424 | B2* | 10/2011 | Ishikawa et al. | 382/103 |
| 2006/0020562 | A1* | 1/2006 | Murali | 706/12 |
| 2006/0280334 | A1* | 12/2006 | Rav-Acha | 382/103 |
| 2007/0285217 | A1* | 12/2007 | Ishikawa et al. | 340/435 |
| 2008/0319664 | A1* | 12/2008 | Kremin et al. | 701/213 |
| 2010/0017128 | A1* | 1/2010 | Zeng | 701/301 |

OTHER PUBLICATIONS

"C. Rabe, U. Franke, and S. Gehrig, "Fast detection of moving objects in complex scenarios," in Proc. IEEE Symp. Intell. Veh., Jun. 2007, pp. 398-403."*

(Continued)

*Primary Examiner* — Claire X Wang
*Assistant Examiner* — Thomas A James
(74) *Attorney, Agent, or Firm* — Squire, Sanders (US) LLP (57) ABSTRACT

The invention relates to a method for detecting the proper motion of an real-world object, comprising the steps of acquiring, by an image capturing device (ICD), a first image ($I_1$) of the object at a first point in time ($t_1$) and a second image ($I_2$) at a second point in time ($t_2$); obtaining a third (hypothetical) image ($I_3$), based on an estimated effect of the motion of the image capturing device (ICD) itself (EMF) between the first and the second point in time ($t_1$, $t_2$), wherein the effect of the motion of the image capturing device (ICD) itself is estimated based on the forward kinematics of the image capturing device; determining an optical flow (OF) between the second image ($I_2$) and the third image ($I_3$); and evaluating the optical flow (OF) by incorporating uncertainties of the optical flow (OF) and the ego-motion-flow (EMF) in order to determine the proper motion of the object.

8 Claims, 5 Drawing Sheets

OTHER PUBLICATIONS

Schmudderich, J.; Willert, V.; Eggert, J.; Rebhan, S.; Goerick, C.; Sagerer, G.; Korner, E.; , "Estimating Object Proper Motion Using Optical Flow, Kinematics, and Depth Information," Systems, Man, and Cybernetics, Part B: Cybernetics, IEEE Transactions on , vol. 38, No. 4, pp. 1139-1151, Aug. 2008 doi: 10.1109/TSMCB.2008.925657.*

Andrea Giachetti, et al., "The Use of Optical Flow for Road Navigation", IEEE Transactions on Robotics and Automation, vol. 14, No. 1, Feb. 1, 1998.

Elisa Martinez et al., Qualitative vision for the guidance of legged robots in unstructured environments, Pattern Recognition, vol. 34, No. 8, Aug. 1, 2001, pp. 1585-1599.

Julian Kolodko et al., "Motion Estimation Hardware for Autonomous Vehicle Guidance", Industrial Electronics society, 2000, IECON 2000, 26th Annual Conference of the IEEE, vol. 2, Oct. 22-28, 2000.

Matthies et al., "Kalman Filter-Based Algorithms for Estimating Depth from Image Sequences", International Journal of Computer Vision, vol. 3, No. 3, Jan. 1, 1989, pp. 209-238.

Gandhi et al., "Parametric ego-motion estimation for vehicle surround analysis using an omnidirectional camera", Machine Vision and Applications, vol. 16, No. 2, Feb. 1, 2005, pp. 85-95.

Jan Horn et al., "Stereo Vision Based Ego-motion Estimation with Sensor Supported Subset Validation",Intelligent Vehicles Symposium, 2007 IEEE, Jun. 1, 2007, pp. 741-748.

Demirdjian et al., "Motion-Egomotion Discrimination and MotionSegmentation from Image-Pair Streams", Computer Vision and Image Understanding, Academic Press, vol. 78, No. 1, Apr. 1, 2000, pp. 53-68.

Fardi et al., "Motion-based pedestrian recognition from a moving vehicle" Intelligent Vehicles Symposium, 2006 IEEE, Jun. 13, 2006, pp. 219-224.

* cited by examiner

ESTIMATING OBJECTS PROPER MOTION USING OPTICAL FLOW, KINEMATICS AND DEPTH INFORMATION

The present invention relates to a method and a corresponding device for estimating the proper motion of an object (Object Proper Motion or OPM), using optical flow and kinematics and depth information, which is applicable in controlling autonomous mobile vehicles, such as robots or cars.

TECHNICAL BACKGROUND

The ability to visually perceive motion is believed to be highly beneficial for surviving in a dynamic environment. So it is not surprising to see that movement is one of the most important cues to attract visual attention. Interestingly, most mammals are able to perceive visual motion even if they are moving themselves—either by rotating the head, the eyes, moving the whole body or even while they are running. The gathered information is then used for controlling the own movement or for tracking moving objects by keeping them centred in the fovea.

In general, a robot's autonomous movement causes the camera to undergo translational and rotational movements in 3D with sudden velocity-changes.

The effects of Ego-Motion (EM) on the Optical Flow (OF), the so called ego-motion-flow (EMF), produced by a robot make this task quite challenging. Primarily, this is caused by the large number of degrees of freedom and the complex influence of each robot segment on the position of the camera: For example, bending the knee may in some situations cause the robot and hence the camera to shift and rotate violently to the side, whereas in other situations, the robot might be standing on the other leg and so knee bending does not affect the camera position at all.

PRIOR ART

The domain where the estimation of object proper motion (OPM) during ego-motion (EM) is commonly addressed is the car domain. Here, this estimation is important to measure the speed of other cars relative to the observing car which allows identifying them as eventual obstacles. Most approaches rely on the calculation of optical flow (OF). This flow is a superposition of the effects caused by ego-motion (EM), the so called ego-motion-flow (EMF), and object proper motion (OPM). A common procedure to decompose the optical flow (OF) and extract the desired object proper motion (OPM) tries to estimate the movement of the camera from the visual flow fields, where the underlying models for camera movement may highly differ in complexity.

For proper extraction of the camera movement it is hence crucial that the optical flow (OF) is primarily caused by ego-motion (EM)—effects and not by independently moving objects—which can not be assumed for a robot facing moving people. The effect of translational ego-motion (EM) on points in the image is highly influenced by their distance to the camera in the way that distant points induce smaller flow vectors than closer ones.

Some of the prior art approaches actually measure the distance of these points. However the majority of methods assume that all points lie on a plane running through the position of the camera and the focus of expansion at the horizon. While this procedure may be suitable for the car domain, no such simplifying assumption about the environment is appropriate for autonomously acting robots in dynamic scenes. Thus, different ways to handle ego-motion (EM) have to be found.

One idea of using existing knowledge about the movement of the camera is as follows. Letting a robot walk in a circle, one may compute the optical flow (OF) resulting from the robot's movement over a textured ground. In conjunction with the robot's gait phase and joint angles, a neural network is trained to learn the ego-motion-flow (EMF). Afterwards differences between this ego-motion-flow (EMF) and the measured optical flow (OF) can be used to detect obstacles in the path of the robot. While the movement of the robot was very constricted, Fidelman et al. ("Detecting motion in the environment with a moving quadruped robot," in RoboCup-2006: Robot Soccer World Cup X, G. Lakemeyer, E. Sklar, D. Sorenti, and T. Takahashi, Eds. Berlin: Springer Verlag, 2007, vol. 4434/2007, pp. 219-231) proved that ego-motion-flow (EMF) can be learned even for more complex movements. In their approach the neural network is provided with the recent optical flow (OF)-calculation in addition to walk phase and joint angles of a robot. The neural net predicts the flow of the next timestep, allowing to compare it with the actually measured optical flow (OF) in order to classify differences as object proper motion (OPM).

The idea of calculating the movement of the camera and using it to compute the ego-motion-flow (EMF) has also been described for the car. In US patent application 2004/0183905 (Comaniciu, D. et al.), readings from gyroscopic sensors or GPS-signals are applied to estimate the camera-movement. Similar to other approaches in cars, the depth is not measured but estimated from the plane assumption as described earlier. Another approach actually computes the ego-motion-flow (EMF) depending on the measured robot joints (del Solar J. R. et al.) ("Motion detection and tracking for an Aibo robot using camera motion compensation and Kalman filtering." in RoboCup 2004: Robot Soccer World Cup VIII, ser. Lecture Notes in Computer Science, D. Nardi, M. Riedmiller, C. Sammut, and J. Santos-Victor, Eds. Berlin: Springer, March 2005, vol. 3276, pp. 619-627) instead of using neural networks.

However, all the results of the provided approaches are not very promising, possibly due to a missing integration of depth information. Fidelman et al. ("Detecting motion in the world with a moving quadruped robot." P. Fidelman, T. Coffman, R. Miikulainen, and P. Stone. Technical Report TR-05-37, Department of Computer Science, University of Texas, 2005) implicitly include depth information by providing the calculated optical flow (OF)-field, which depends on the distance of points to the camera. Nevertheless, this approach can not cope properly with objects having a distance different from objects in the training-phase: The difference in distance results in an optical flow (OF) deviating from the learned one. Hence even non-moving points can be classified as object proper motion (OPM). The combination of knowledge about the robot movement with distance information and optical flow (OF)-measurements is described in a paper by Overett, G. et al. (G. Overett and D. Austin, "Stereo vision motion detection from a moving platform," in Proc. Australasian Conf. on Robotics and Automation, December 2004). Having cameras fixed to the robot, Overett et al. try to measure the odometry data and compute the resulting ego-motion-flow (EMF) considering the depth. This flow is afterwards subtracted from the estimated optical flow (OF) and residual vectors are used to indicate object proper motion (OPM). Unfortunately, the noisy data from odometry forces the authors to manually measure the distance passed by the robot, preventing the system from running in real time.

None of the presented methods precomputes a movement of the camera and searches for movement relative to it. When acquiring the effects of camera movement that is superimposed with the effects of independently moving objects, the optical flow (OF) needs a large set of displacements. The higher range of acquired motion does not only increase the computational time but also corrupts optical flow (OF)-estimations by producing increased ambiguities. Very recently Rabe et al. ("Fast detection of moving objects in complex scenarios," in Proc. IEEE Symp. Intelligent Vehicles, June 2007, pp. 398-403) proposed a solution to this problem by computing flow and disparity from visual features tracked in the image instead of estimating dense depth- and flow-fields. Fusing the results in a Kalman filter provides 6D information about location and motion for a set of points. Together with readings from inertial sensors this information is used to compensate ego-motion (EM)-effects and obtain the actual 3D object proper motion (OPM). The results are very convincing, at least for the moderate movement of a car. However, apparently no procedure was presented which is able to handle the noisy character of depth, optical flow (OF) and the fierce effects of camera-movement induced by a legged robot, combining them to make reliable estimations of object proper motion (OPM).

Fardi et al. ("Motion-based pedestrian recognition from a moving vehicle," in Proc. IEEE Symp. Intelligent Vehicles, June 2006, pp. 219-224) present a method for recognizing pedestrians from a moving vehicle comprising the computation of an optical flow, including the compensation of the ego motion of the camera.

In Fardi et al, the region of interest is regarded as a plane with a uniform depth z (distance to the camera) that is calculated from a distance measurement of a laser scanner and is used for all the pixels in the region of interest. However, this assumption about the depth is not applicable in all situations in which an accurate estimate of the proper motion of an object is desired. This effect becomes more significant for objects close to the camera and in front of a distant background.

It is therefore an object of the present invention, to provide a method and device for estimating the proper motion of objects by handling depth information more precisely, being capable to provide and take advantage of the confidence of the OPM estimation for every pixel in an image sequence.

SHORT SUMMARY OF THE INVENTION

This object is achieved according to the invention by a method and a system according to the independent claims. Advantageous embodiments are defined in the dependent claims.

SHORT DESCRIPTION OF THE FIGURES

More aspects and advantages of the present invention will become more apparent when the following detailed description of the invention is studied, in connection with the annexed drawing, in which.

DETAILED DESCRIPTION OF THE INVENTION

Figure 1:
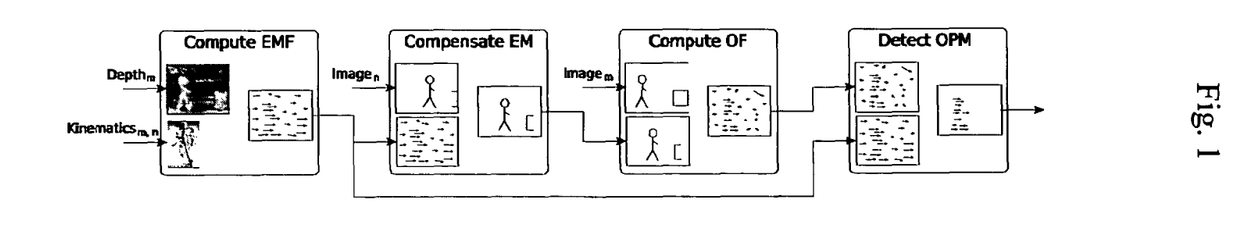
FIG. 1 shows an overview of a system according to an embodiment of the present invention.

FIG. 1 shows an overview of a system according to the embodiments of the present invention:

In a first step the forward kinematics are used to compute the movement of the camera occurring in the time-interval from m to n=m+1. Combining this with the depth information from binocular disparity, one may estimate where a static point in the image at time m moved due to ego-motion (EM) and obtain the ego-motion-flow (EMF). Hence, by knowing where a point in the image at time n originated from, the ego-motion (EM)-effect may be compensated by moving the point back to its original position in a second step, resulting in an image freed from EM-effects. Afterwards this image may be used for a calculation of the optical flow (OF) measured relative to the ego-motion-flow (EMF). This step-by-step movement estimation allows the reduction of the optical flow's (OFs) search-range which does not only reduce computational time but also decreases possible ambiguities in the optical flow (OF)-measurement and thereby leads to qualitatively better results. Ideally, the optical flow (OF) measured in this way should be zero for non-moving objects and otherwise describe their proper motion.

However, since binocular disparity as well as optical flow (OF) are particularly noisy signals, suitable methods may be applied to filter out wrong velocity-estimations based on the reliability of flow- and ego-motion (EM)-vector.

Computation of Ego-Motion-Flow (EMF)

The computation of ego-motion-flow (EMF) results in a flow field $E^m = \{\vec{e}_i^m\}$, which describes where the points in image $I^m$ have shifted to in $I^n$, caused by movement of the camera. For this computation it is assumed that the environment is static and the points did not move themselves.

To account for the fact that the absolute values of the vectors $\vec{e}_i^m$ in highly depend on the distance of the corresponding points to the camera, the effect of camera movement may be calculated in a three dimensional camera-related space. Therefore, first each point $(x_i^m, y_i^m)$ may be combined in the image with its binocular disparity $d_i^m$, to define a point in homogenous image-coordinates as $$\vec{p}_{I,i}^{m} = (x_i^m, y_i^m, d_i^m, 1)^T$$

This point can then be reconstructed in camera-coordinates by computing the homogenous transformation matrix $T_{I \leftarrow C}$ from camera-to image-coordinates and by multiplying $\vec{p}_{I,i}^{m}$ with it:

$$p_{C,i}^{m} = T_{C \leftarrow I} p_{I,i}^{m}$$

To compute the position of each such point relative to the camera at the next time step, the way the camera moved has to be known. This knowledge may be obtained from the robot kinematics. For this purpose, the robot's state vector $\vec{s}^m$, which contains the position of the upper body as well as the angles of all joints at time m is used. With this vector, one may compute the forward kinematics, returning the transformations from the initial world-coordinate system to each robot segment, and including the transformation from world- to camera-coordinates $T_{C \leftarrow W}^m$.

Inverting this transformation results in $T_{W \leftarrow C}^m$, which describes the transformation from camera- to world-coordinates. In addition, the current transformation $T_{C \leftarrow W}^n$ can be computed by applying $\vec{s}^n$. Since this calculation includes the position of the upper body, the resulting transformations are not only rotation-matrices but also encode translational changes of the camera-position.

Assuming a static point $\vec{p}_{C,i}^m$, the new position $\vec{p}_{C,i}^n$ can be calculated from transferring the point to world-coordinates by multiplying the last transformation $T_{W \leftarrow C}^m$ and passing it back to camera-coordinates with the actual transformation $T_{C \leftarrow W}^n$:

$$\vec{p}_{C,i}^n = T_{C \leftarrow W}^n T_{W \leftarrow C}^m \vec{p}_{C,i}^m \quad (3)$$

Figure 2:
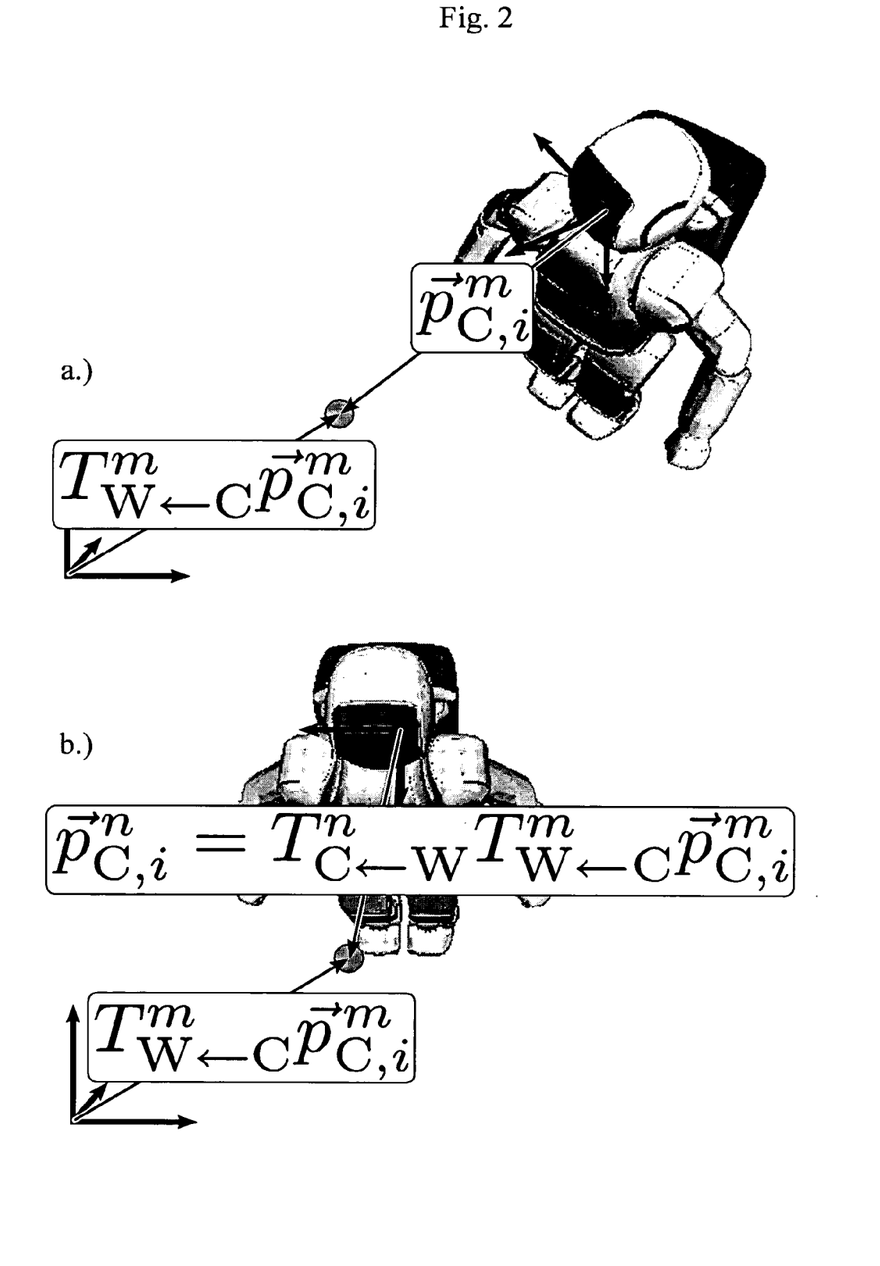
FIG. 2a shows a point $\vec{p}_{C,i}^{m}$ in camera- and world coordinates.
FIG. 2b shows the description of the static point at time n using the camera-transformations.

This process is illustrated in FIG. 2.

Since one is not interested in the new three dimensional position of the points but rather in the 2D-flow in the image, each point may be projected back into the image-plane. This can be done by computing a homogenous projection-matrix $T_{I \leftarrow C}$ and multiplying the new point $\vec{p}_{C,i}^n$ with it:

$$\vec{p}_{I,i}^n = T_{I \leftarrow C} \vec{p}_{C,i}^n$$

Due to the constancy of $T_{C \leftarrow I}$, $T_{W \leftarrow C}^m$, and $T_{I \leftarrow C}$ within a timestep, the concatenation of these transformations may be pre-computed, resulting in one single transformation matrix which may be multiplied with each point $\vec{p}_{I,i}^m$.

Knowing $\vec{p}_{I,i}^n$ and $\vec{p}_{I,i}^m$ the shift of a point in the image-plane due to camera-motion is given by $$\vec{e}_i^m = \begin{pmatrix} x_i^n - x_i^m \\ y_i^n - y_i^m \end{pmatrix}$$

To express the reliability of this shift-vector, only the quality of the measured depth $z_i^m$ of $\vec{p}_{C,i}^m$ has to be considered, since the computation of the kinematics is deterministic. The reliability of $\vec{e}_i^m$ relates to the amount of correlation found by the disparity-algorithm between the left and the right camera-image. This is expressed in terms of some confidence-value $c \in [0,1]$. In addition the falling accuracy with increasing distance may be taken into account.

The sensitivity for depth estimation from disparity decreases with the squared distance:

$$\frac{\partial d}{\partial z} = -\frac{b \cdot f}{(z^m)^2} q$$

where b denotes the baseline, $f$ the focal-length and q the pixel-size of the camera.

Since one wants to describe the likelihood for $\vec{e}_i^m$ in terms of some probability distribution, one may express a decay of reliability in terms of an increasing variance $$\sum_{c}^{m}$$

by declaring it as $$\sum_{e_i}^{m} = 1 \cdot w_e \left( (1 - w_d) c_i + w_d \frac{\partial d^m}{\partial z_i^m} \right)^{-1}$$

with 1 being the unity-matrix. The scalar $w_e$ may be used to express a weighting of the whole variance which is beneficial for the comparison of this variance with the one from the optical flow (OF) (see below). Additionally $w_d \in [0,1]$ may be utilized to stress the influence of either confidence or distance.

Computation of Flow Relative to Ego-Motion-Flow (EMF)

Figure 3:
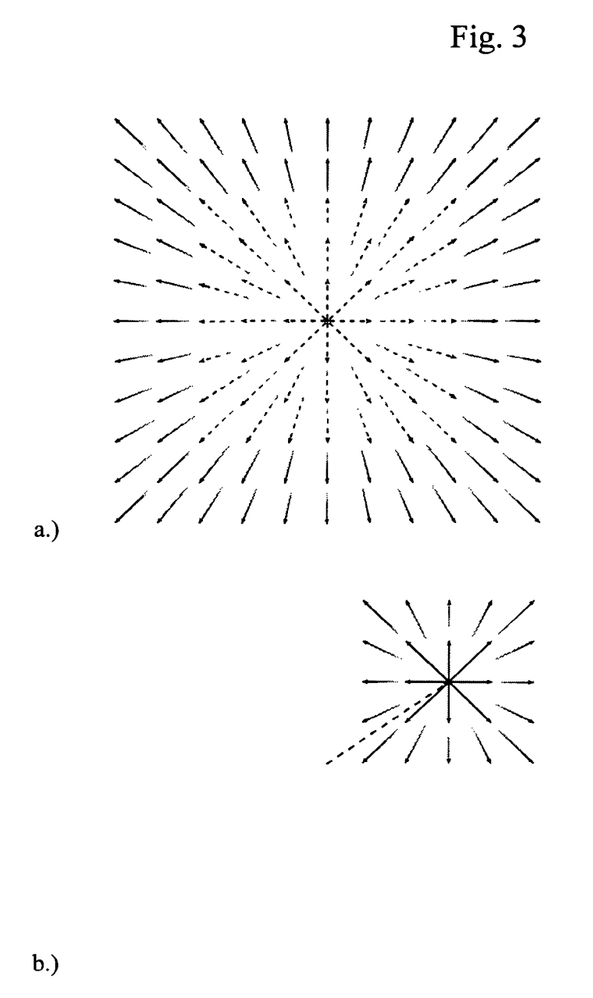
FIG. 3a shows the spectrum of optical flow (OF)-motion, if ego-motion (EM)-effects are not cancelled out in advance. The solid line visualizes an assumed object proper motion (OPM) of two pixels, the dashed line an assumed ego-motion (EM)-effect of three pixels. The interval which has to be acquired by the optical flow (OF) is a superposition of the two.
FIG. 3b shows the reduced spectrum for searching relative to ego-motion-flow (EMF)

Since the effects of ego-motion (EM) have been computed on the image, one is now able to compute the optical flow (OF) $R^m = \{\vec{r}_i^m\}$ between $I^m$ and $I^n$ relative to this ego-motion-flow (EMF). In comparison to other approaches which cancel out ego-motion (EM)-effects after the computation of the optical flow (OF), this reduces the spectrum of the motion to be acquired. This effect which is illustrated in FIG. 3 does not only reduce computational time but also improves the optical flow (OF)-estimations by reducing ambiguities.

The ego-motion (EM)-effects may be compensated by warping the images. In the present case, warping using a forward mapping can be written as $$\tilde{I}^m(\vec{p}_{I,i}^m + \vec{e}_i^m) = I^m(\vec{p}_{I,i}^m)$$

where $\tilde{I}^m$ equals the old image $I^m$ but is freed from the measured ego-motion (EM)-effects. This kind of forward mapping has two major drawbacks: Since $\vec{e}_i^m$ usually encodes real-valued shifts, the data-points $\vec{p}_{I,i}^m + \vec{e}_i^m$ may not lie inside the grid and require complicated interpolations. Additionally, it is not guaranteed that each point in the warped image is targeted by the sum of original position and shift, leading to holes in the image.

The more flexible solution lies in the usage of backward-mapping to warp the actual image $I^n$ back to $\tilde{I}^n$:

$$\tilde{I}_n(\vec{p}_{I,i}^m) = I^n(\vec{p}_{I,i}^m + \vec{e}_i^m)$$

Figure 4:
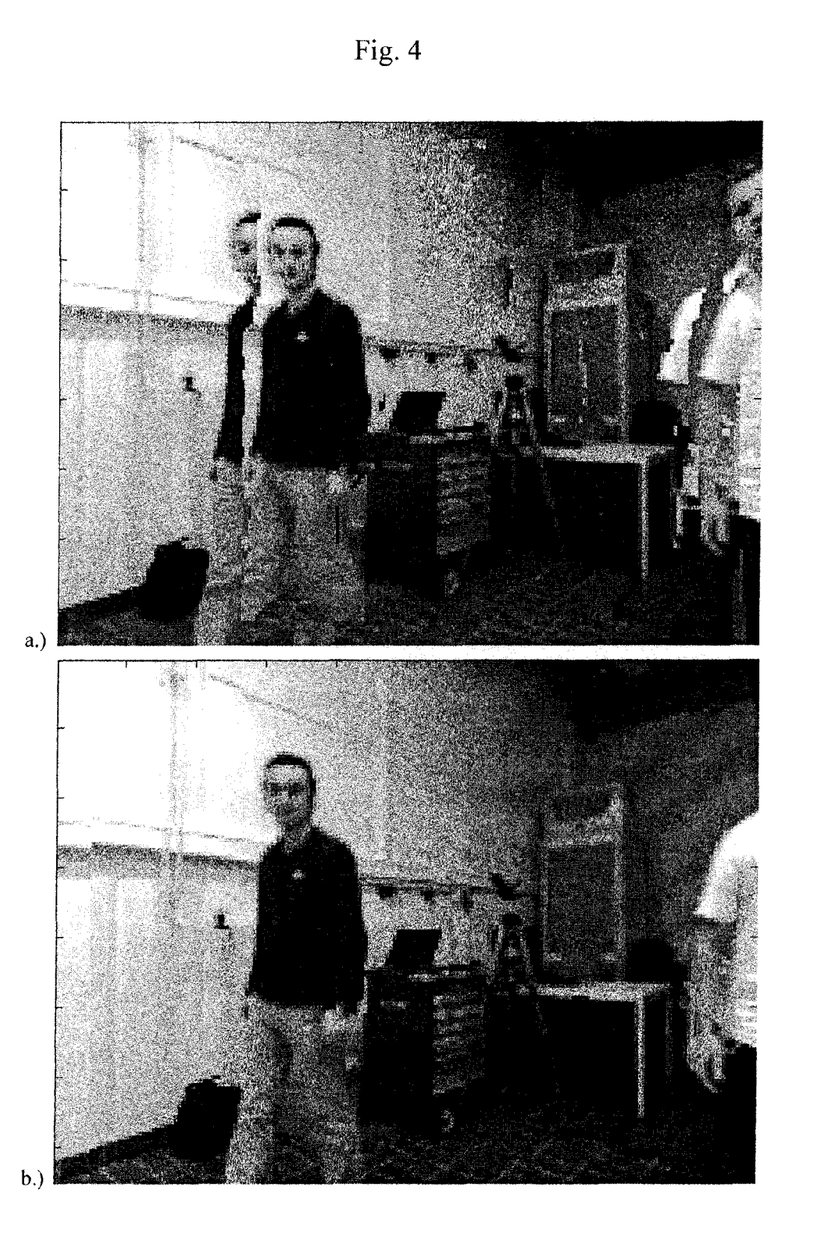
FIG. 4a shows the disrupted results of pixel wise warping under extreme body movements.
FIG. 4b shows the effect of filling-in holes in the ego-motion-flow (EMF) with the averaged flow.

Since data points are now passed as arguments for the resulting image $\tilde{I}^n$, holes in the image can not occur. The problem of real-valued shifts may be tackled by using bilinear interpolation in the source-image. Apart from deviations caused by wrong depth measurements, $\tilde{I}^n$ and $I^m$ should only differ in points with individual object motion. Nevertheless, in some situations with extreme body-movement, holes in the depth image $D^m$ can cause artefacts in the pixelwise warped image, as shown in FIG. 4(a). These artefacts lead to errors in the computed optical flow (OF) and can hence affect surrounding regions, even if those regions have valid depth estimations. In a first step, these artefacts may be reduced by filling invalid regions with suitable assumptions obtained from valid ego-motion-flow (EMF)-estimations.

In one embodiment of the present invention, the average ego-motion-flow (EMF) $\hat{v}_E^m$ gained from valid depth-estimations may be used to fill the gaps (see FIG. 4(b)). To account for the decreased reliability of the warped image and hence of the optical flow (OF), one may create a penalty-map P which is high for points near and inside invalid depth-regions and 0 otherwise.

By passing $I^m$ and $\tilde{I}^n$ to an optical flow (OF)-algorithm, a velocity estimate $\vec{r}_i^m$ may be obtained for each point, relative to the estimated ego-motion-flow (EMF). The algorithm may also compute a covariance $$\sum_C^m$$

which gives a confidence measure for the optical flow vectors, assuming pixelwise independent Gaussian noise.

For the inclusion of the warping-based penalty, the compound variance $\Sigma_r^m$ at point $\vec{p}_{I,i}^m$ may be calculated as $$\sum_{r_i}^m = 1 \cdot P(\vec{p}_{I,i}^m) + \sum_{C_i}^m \quad (10)$$

For invalid points the choice of $$1 \cdot \vec{p}_{I,i}^m \gg \sum_C^m$$

ensures a negligible influence of the confidence-based variance. This is useful since artefacts in the warped image usually increase the structure at that specific region and thereby lead to high confidence-measures of the optical flow (OF)-algorithm.

Besides the spatial integration, the proposed invention also allows prediction over time, giving it the ability to iteratively make reliable calculations of motion in unstructured image regions by drawing previous estimations into account. The ideal outcome of the flow-algorithm would be a vector-field, which is zero for non-moving objects and denotes their proper motion otherwise. However, since the optical flow (OF) as well as depth-measurements from disparity are very noisy signals, some more filtering is needed for the detection of object proper motion (OPM).

Detecting Object Proper Motion (OPM)

In the previous sections, two approaches for the calculation of image flow were introduced, which use very different methods and hence show different characteristics. Since the computation of the ego-motion-flow (EMF) is based on disparity and kinematics, it can acquire the effects of ego-motion (EM) on image-points, as long as the points are not moving. In contrast, the optical flow (OF) also works for moving points. By adding the ego-motion-flow (EMF) to the relative optical flow (OF), an overall flow may be obtained, which designates the compound retinal movement of object proper motion (OPM) and ego-motion (EM)-effects. For non-moving points, this flow should equal the ego-motion-flow (EMF), while it should be different for moving points. A measurement for the significance of this distance may be introduced and used to extract object proper motion (OPM)-vectors from the optical flow (OF).

This measurement is derived from a stochastic assumption about the estimated flows, the depth and the images. Therefore, some stochastic variables have to be defined for each point $\vec{p}_{I,i}$ in the image a. Each vector of the overall flow mentioned above is represented by the variable $\theta_i$ while $\epsilon_i$ describes the ego-motion (EM)-vector for each point $\vec{p}_{I,i}$. The random variables $I=\{I^m, I^n\}$ and $D=D^m$ specify the observed source- and depth-images.

The principal idea for the approach is to estimate the probability of measuring the same velocity $v_i$ from the ego-motion-flow (EMF) and from the compound optical flow (OF), assuming the corresponding point is static. That is, if some point did not move, the velocity described by $\epsilon_i$ should not differ too much from $\theta_i$ and the likelihood to measure some identical velocity $v_i$ from both methods should be high. In contrast, a moving point results in different outcomes for $\epsilon_i$ and $\theta_i$ and the likelihood to measure the same velocity $v_i$ from the two methods is very low. Concluding, a high joint probability $\rho(\theta_i=v_i, \epsilon_i=v_i, I, D)$ indicates a static point whereas a low probability indicates a moving point.

Reflecting the assumptions about the dependencies of $\epsilon_i$, $\theta_i$, D and I, this joint distribution can be decomposed into $$\rho(\theta_i=v_i,\epsilon_i=v_i,I,D)=\rho(\theta_i=v_i|\epsilon_i,I)\rho(\epsilon_i=v_i|D)\rho(I)\rho(D) \quad (11)$$

Since no prior assumptions are made about the source images and the depth, the corresponding variables are uniformly distributed and hence have no influence on the distribution. Using the precomputed results for the ego-motion-flow (EMF) and optical flow (OF), the conditional distributions may be approximated with Gaussians $N(\vec{r}, \Sigma)$ with mean and variance parameters, so that $$\rho(\theta_i=v_i|\epsilon_i,I) \propto N_{v_i}(\vec{r}_i+\vec{e}_i,\Sigma_r) \quad (12)$$

$$\rho(\epsilon_i=v_i|D) \propto N_{v_i}(\vec{e}_i,\Sigma_e) \quad (13)$$

Adding $\vec{e}_i$ in (12) accounts for the warping of the image—while $\vec{r}_i$ encodes a flow relative to the ego-motion-flow (EMF), the sum of $\vec{e}_i$ and $\vec{r}_i$ makes it an absolute flow and allows the comparison with the ego-motion-flow (EMF). With this approximation the joint distribution is proportional to the product of two Gaussians, being defined as)

$$N_{v_i}(\vec{r}_i+\vec{e}_i,\Sigma_r)N_{v_i}(\vec{e}_i,\Sigma_e)=L_i \cdot N_{v_i}(\vec{c}_i,C_i)$$

with: $\vec{c}_i=\Sigma_{r_i}(\Sigma_r\Sigma_{e_i})^{-1}\vec{e}_i+\Sigma_{e_i}(\Sigma_{r_i}\Sigma_{e_i})^{-1}(\vec{r}_i+\vec{e}_i) \quad (14)$ $$C_i=\Sigma_{r_i}(\Sigma_{r_i}\Sigma_{e_i})^{-1}\Sigma_{e_i} \quad (15)$$

$$L_i=N_{\vec{e}_i}(\vec{r}_i+\vec{e}_i,\Sigma_{r_i}+\Sigma_{e_i})$$

This procedure is identical for each time step, so the time indices have been dropped for convenience.

Figure 5:
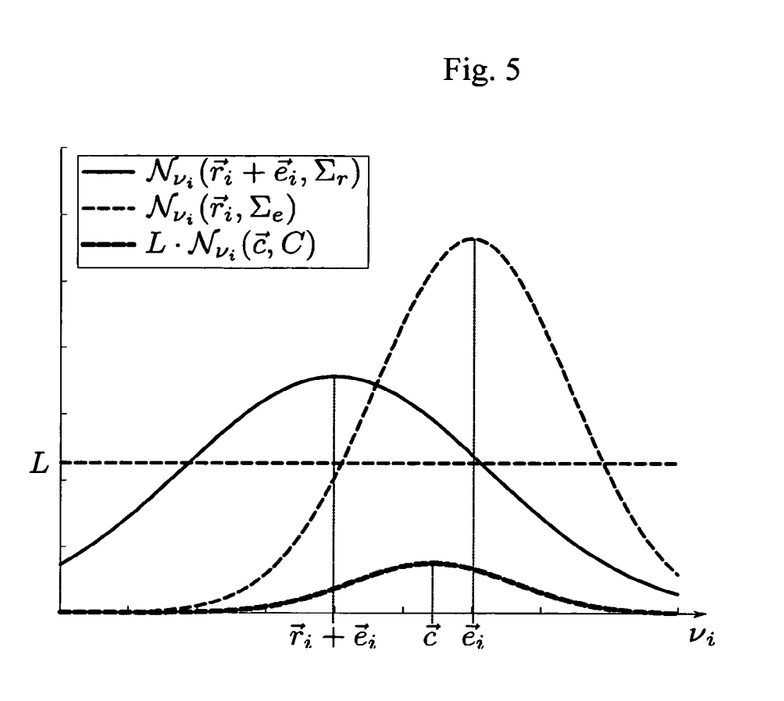
FIG. 5 shows a one-dimensional plot of the resulting distribution $N_{\vec{v}}(\vec{c}, C)$ from) $N_{v_i}(\vec{r}_i + \vec{e}_i, \Sigma_r)$ and $N_{v_i}(\vec{e}_i, \Sigma_e)$ as well as the likelihood L.

A visualization of this product is shown in FIG. 5. The mean value $\vec{c}$ of the resulting distribution can be interpreted as that identical velocity which is most likely to be measured by both algorithms—the ego-motion-flow (EMF) and the optical flow (OF). While it is always possible to find such a value which fits best the hypothesis of a common velocity the factor L is a measure to describe how well $\vec{c}$ actually fits in the light of the calculated displacements and variances. For the evaluation of object proper motion (OPM), one is not interested in the value of the vector $\vec{c}$, but rather whether such a vector is likely to occur. So the rejection of optical flow (OF)-estimations may be based on this value L, and can be further simplified by applying the logarithm to L:

$$L_i = N_{\vec{e}_i}\left(\vec{r}_i + \vec{e}_i, \sum_{r_i} + \sum_{e_i}\right) \quad (16)$$

$$= z \cdot e^{-\frac{1}{2}(\vec{e}_i - (\vec{r}_i + \vec{e}_i))^T (\Sigma_{r_i} + \Sigma_{e_i})^{-1} (\vec{e}_i - (\vec{r}_i + \vec{e}_i))} \quad (17)$$

$$\propto -\vec{r}_i^T \left(\sum_{r_i} + \sum_{e_i}\right)^{-1} \vec{r}_i \quad (18)$$

That is, the decision whether some optically measured velocity is classified as object proper motion (OPM) is based on the absolute value of that velocity scaled by the variances of the ego-motion-flow (EMF) and the optical flow (OF). Defining $\vec{r}_i^T(\Sigma_r+\Sigma_e)^{-1}\vec{r}_i$ as Mahalanobis norm $\|\vec{r}_i\|_M$, a big Mahalanobis norm indicates a moving point, so one may rely on the computation of the optical flow (OF). Formally, this can be expressed as $$\vec{o}_i = \begin{cases} 0 & \text{if } \|\vec{r}_i\|_M < \theta_M \\ \vec{r}_i & \text{otherwise} \end{cases} \quad (19)$$

In subsequent processing stages, $\vec{o}_i$ may be used to extract regions of the visual input where reliably measurable object proper motion (OPM) occurs.

CONCLUSION

The present invention provides a method and a system being capable of perceiving object proper motion (OPM) from a moving platform. The step-by-step movement estimation including the compensation of ego-motion (EM) prior to the optical flow (OF)-computation seems to be a central aspect for the robustness of the system against firm ego-motion (EM) of the robot. Robustness against noise in the depth and flow-estimation results from the probabilistic rejection mechanism, which neglects velocities based on their size and reliability.

The proper object motion computed by this method and system may be used for the attraction of visual attention as well as real-time object interaction. More particularly, an autonomous robot or a car may be controlled using the proper motion of objects, as determined by the invention, e.g. for controlling their own movement or for tracking a moving object by keeping it centred in the image detector's view.

We claim:

1. A method for detecting proper motion of real-world objects in an image from an image capturing device, the method comprising the steps of:

acquiring, by an image capturing device, a first image of an object at a first point in time and a second image at a second point in time;

acquiring depth information for each pixel of the first image and the second image, computing a third image, based on the first image or the second image as well as estimated ego-motion of the image capturing device itself between the first point and the second point in time, wherein the ego-motion is estimated based on forward kinematics of the image capturing device and depth information for each pixel of the first image;

computing an ego motion-compensated optical flow by comparing the second image and the third image; and determining proper motion of the object by evaluating the optical flow based on a likelihood that the optical flow and the estimated ego-motion are consistent with the same physical velocity.

2. The method according to claim 1, wherein the depth information for the first image is estimated based on binocular disparity.

3. The method according to claim 2, wherein an invalid estimated depth is replaced by a depth model gained from valid estimated depths.

4. The method according to claim 1, wherein the step of computing the third image comprises warping the first image.

5. The method according to claim 1, wherein the step of computing the third image comprises warping the second image.

6. A mobile autonomous vehicle controlled by the method according to claim 1.

7. The mobile autonomous vehicle according to claim 6, wherein the mobile autonomous vehicle is an autonomous robot.

8. A system for detecting proper motion of real-world objects in an image from an image capturing device, the system comprising:

means for acquiring, by an image capturing device, a first image of an object at a first point in time and a second image at a second point in time;

means for acquiring depth information for each pixel of the first image and the second image, means for computing a third image, based on an estimated effect of motion of the image capturing device itself between the first point and the second point in time, wherein the effect of the motion of the image capturing device itself is estimated based on forward kinematics of the image capturing device and depth information for each pixel of the first image;

means for determining an ego motion-compensated optical flow by comparing the second image and the third image; and means for determining proper motion of the object by evaluating the optical flow based on a likelihood that the optical flow and the estimated ego-motion are consistent with the same physical velocity by incorporating uncertainties of the optical flow and ego-motion-flow in order to determine the proper motion of the object.

\* \* \* \* \*